(12) United States Patent
Arafat et al.

(10) Patent No.: US 12,107,526 B2
(45) Date of Patent: Oct. 1, 2024

(54) CONTROLLING ELECTRIC DRIVE SYSTEMS BASED ON TEMPERATURE READINGS

(71) Applicant: Cummins Inc., Columbus, IN (US)

(72) Inventors: Akm Arafat, Blaine, MN (US); Minyu Cai, Maplewood, MN (US); Dakshina S. Murthy-Bellur, Plymouth, MN (US)

(73) Assignee: CUMMINS INC., Columbus, IN (US)

( * ) Notice: Subject to any disclaimer, the term of this patent is extended or adjusted under 35 U.S.C. 154(b) by 150 days.

(21) Appl. No.: 17/923,817

(22) PCT Filed: May 5, 2021

(86) PCT No.: PCT/US2021/030832
§ 371 (c)(1),
(2) Date: Nov. 7, 2022

(87) PCT Pub. No.: WO2021/226201
PCT Pub. Date: Nov. 11, 2021

(65) Prior Publication Data
US 2023/0179138 A1 Jun. 8, 2023

Related U.S. Application Data

(60) Provisional application No. 63/021,964, filed on May 8, 2020.

(51) Int. Cl.
*H02K 11/25* (2016.01)
*H02P 23/00* (2016.01)
(Continued)

(52) U.S. Cl.
CPC .......... *H02P 29/64* (2016.02); *H02P 23/0004* (2013.01); *H02P 27/08* (2013.01)

(58) Field of Classification Search
CPC ...... H02P 29/64; H02P 23/0004; H02P 27/08; H02K 11/25
See application file for complete search history.

(56) References Cited

U.S. PATENT DOCUMENTS

| | | |
|---|---|---|
| 6,434,505 B1 | 8/2002 | Koepke |
| 7,248,009 B1 | 7/2007 | Sundquist |

(Continued)

FOREIGN PATENT DOCUMENTS

| | | |
|---|---|---|
| CN | 108562854 A | 9/2018 |
| EP | 1450460 B1 | 8/2004 |
| WO | 2015120851 A2 | 8/2015 |

OTHER PUBLICATIONS

International Search Report and Written Opinion for International patent application No. PCT/US2021/030832, filed May 5, 2021, mailed Aug. 23, 2021.

(Continued)

*Primary Examiner* — Cortez M Cook
(74) *Attorney, Agent, or Firm* — Faegre Drinker Biddle & Reath LLP

(57) ABSTRACT

A method for operating an electric drive system is provided. For example, a controller retrieves, from memory, a predictive model indicating predictive winding temperatures associated with known negative temperature coefficient (NTC) temperatures, wherein the predictive model is based on historical NTC temperatures and historical winding temperatures, as well as one or more operating parameters. The controller receives current NTC information indicating one or more current NTC readings corresponding to one or more switching devices within the inverter. The controller determines estimated winding temperatures corresponding to the electric machine based on the predictive model and the one or more current NTC readings as well as current operating (Continued)

parameters. The controller provides instructions to adjust inputs to the electric machine based on the estimated winding temperatures.

20 Claims, 5 Drawing Sheets

(51) Int. Cl.
  *H02P 27/08* (2006.01)
  *H02P 29/64* (2016.01)

(56) References Cited

U.S. PATENT DOCUMENTS

| | | |
|---|---|---|
| 7,592,820 B2 | 9/2009 | Laakso |
| 8,487,575 B2 | 7/2013 | Yeh |
| 9,417,000 B1 | 8/2016 | Scaringe et al. |
| 9,912,215 B2 | 3/2018 | Oohara |
| 2009/0033260 A1 | 2/2009 | Fernengel |
| 2009/0066283 A1 | 3/2009 | Son et al. |
| 2014/0268458 A1 | 9/2014 | Luciani et al. |
| 2017/0012567 A1* | 1/2017 | Oohara ............... H02K 11/25 |
| 2017/0155353 A1 | 6/2017 | Lee |
| 2017/0346370 A1 | 11/2017 | Sentis et al. |
| 2018/0201152 A1 | 7/2018 | Newman et al. |
| 2018/0241326 A1 | 8/2018 | Stichweh et al. |
| 2022/0221494 A1* | 7/2022 | Lee ................... H02M 7/5395 |

OTHER PUBLICATIONS

Calzo et al., "Thermal regulation as control reference in electric drives", IEEE, Sep. 4, 2012, pp. 1-7.

European Search Report for EP Patent Application No. 21800828.2, Issued on Apr. 5, 2024, 9 pages.

* cited by examiner

CONTROLLING ELECTRIC DRIVE SYSTEMS BASED ON TEMPERATURE READINGS

CROSS-REFERENCE TO RELATED APPLICATIONS

The present application claims priority to International Patent Application No. PCT/US2021/030832, filed May 5, 2021, which claims priority to U.S. Provisional Application Ser. No. 63/021,964, entitled "CONTROLLING MULTI-PHASE ELECTRIC SYSTEMS BASED ON TEMPERATURE READINGS," filed on May 8, 2020, the entire disclosures of which are being expressly incorporated herein by their reference.

FIELD OF THE DISCLOSURE

The present disclosure generally relates to electric drive systems, and more particularly to techniques for controlling the operation of electric drive systems based on temperature readings.

BACKGROUND OF THE DISCLOSURE

Electric drive systems (e.g., machines) are utilized in various applications including electric vehicles. For example, a drive system of an electric vehicle typically includes an alternating current (AC) electric motor driven by a direct current (DC) power source (e.g., a main battery). The AC electric motor is coupled to the DC power source via a power inverter that performs switching functions to convert the DC power to AC power One example of an electric system includes a six-phase electric machine with six windings.

In some instances, the thermal stress of the windings of the electric systems may cause phase unbalancing, which may cause the electric system to start making noises after a certain period of time. Furthermore, in some examples, the windings may operate within a certain temperature range and operating outside of the temperature range may cause damage to the windings. Embedded temperature sensors within the windings may provide feedback to prevent damage to the coil additions and/or to prevent phase unbalancing due to thermal stress. However, some electric systems might not have embedded winding temperature sensors. Furthermore, even if the devices have these sensors, the winding temperature sensors may malfunction occasionally. Accordingly, there remains a need to develop techniques in order to address one or more of the above-noted drawbacks.

SUMMARY

According to one embodiment, the present disclosure provides a method for operating an electric drive system comprising an electric machine, an inverter, and a controller. The method includes steps of retrieving, from memory and by the controller, predictive model indicating predictive winding temperatures associated with known thermistor negative temperature coefficient (NTC) temperatures, wherein the predictive model is based on historical NTC temperatures and historical winding temperatures; receiving current NTC information indicating one or more current NTC readings corresponding to one or more switching devices within the inverter; determining estimated winding temperatures corresponding to the electric machine based on the predictive model and the one or more current NTC readings; and providing instructions to adjust inputs to the electric machine based on the estimated winding temperatures.

In some embodiments, the method further includes steps of determining the predictive model indicating the predictive winding temperatures associated with the known NTC temperatures; and storing the predictive model in the memory.

In some embodiments, determining the predictive model may include: receiving, from one or more temperature sensors operatively coupled to one or more windings of the electric machine, the historical winding temperatures for a first period of time; receiving, from one or more NTC temperature sensors, the historical NTC temperatures for the first period of time; and training a model using a dataset to generate the predictive model using the historical winding temperatures and the historical NTC temperatures.

In some embodiments, training the model may include determining a non-linear or linear mathematical model using the historical NTC temperatures from all the transistors and the historical winding temperatures.

In some embodiments, determining the predictive model may further include: adjusting one or more operating parameters associated with the electric drive system, receiving, from the one or more temperature sensors operatively coupled to the one or more windings of the electric machine, a second set of historical winding temperatures based on the adjusting the one or more operating parameters: receiving, from the one or more NTC temperature sensors, a second set of historical NTC temperatures based on the adjusting the one or more operating parameters, and wherein the training the model using the dataset to generate the predictive model comprises training the dataset using the historical winding temperatures, the historical NTC temperatures, the second set of historical winding temperatures, and the second set of historical NTC temperatures.

In some embodiments, adjusting the one or more operating parameters may include adjusting a switching frequency associated with the one or more switching devices within the inverter.

In some embodiments, adjusting the one or more operating parameters may include adjusting a direct current (DC) voltage associated with a power source, wherein the power source provides DC power to the inverter.

In some embodiments, adjusting the one or more operating parameters may include adjusting a stator current associated with the inverter and the electric machine.

In some embodiments, adjusting the one or more operating parameters may include adjusting a power factor (PF) associated with the multi-phase electrical system.

In some embodiments, adjusting the one or more operating parameters may include altering a switching method for the inverter.

According to another embodiment, the present disclosure provides a controller of an electric driver system having an electric machine and an inverter. The controller includes a processor and a memory having a plurality of instructions stored thereon that, when executed by the processor, causes the controller to retrieve a predictive model indicating predictive winding temperatures associated with known thermistor negative temperature coefficient (NTC) temperatures, wherein the predictive model is based on historical NTC temperatures and historical winding temperatures, receive current NTC information indicating one or more current NTC readings corresponding to one or more switching devices within the inverter, determine estimated winding temperatures corresponding to the electric machine based on the predictive model and the one or more current NTC readings, and provide instructions to adjust inputs to the electric machine based on the estimated winding temperatures.

In some embodiments, the plurality of instructions, when executed, further cause the controller to determine the predictive model indicating the predictive winding temperatures associated with the known NTC temperatures, and store the predictive model in the memory.

In some embodiments, to determine the predictive model comprises to receive, from one or more temperature sensors operatively coupled to one or more windings of the electric machine, the historical winding temperatures for a first period of time, to receive, from one or more NTC temperature sensors, the historical NTC temperatures for the first period of time, and to train a model using a dataset to generate the predictive model using the historical winding temperatures and the historical NTC temperatures.

In some embodiments, to train the model comprises to determine a non-linear or linear mathematical model using the historical NTC temperatures and the historical winding temperatures.

In some embodiments, to determine the predictive model comprises to adjust one or more operating parameters associated with the electric drive system, to receive, from the one or more temperature sensors operatively coupled to the one or more windings of the electric machine, a second set of historical winding temperatures based on the adjusting the one or more operating parameters, and to receive, from the one or more NTC temperature sensors, a second set of historical NTC temperatures based on the adjusting the one or more operating parameters, wherein the training the model using the dataset to generate the predictive model comprises training the dataset using the historical winding temperatures, the historical NTC temperatures, the second set of historical winding temperatures, and the second set of historical NTC temperatures.

In some embodiments, to adjust the one or more operating parameters comprises to adjust a switching frequency associated with the one or more switching devices within the inverter.

In some embodiments, to adjust the one or more operating parameters comprises to adjust a direct current (DC) voltage associated with a power source, wherein the power source provides DC power to the inverter.

In some embodiments, to adjust the one or more operating parameters comprises to adjust a stator current associated with the inverter and the electric machine.

In some embodiments, to adjust the one or more operating parameters comprises to adjust a power factor (PF) associated with the multi-phase electrical system.

In some embodiments, to adjust the one or more operating parameters comprises to alter a switching method for the inverter.

In some embodiments, to adjust the one or more operating parameters comprises to adjust a stator current associated with the inverter and the electric machine, to adjust a power factor (PF) associated with the multi-phase electrical system, or to alter a switching method for the inverter.

In some embodiments, the plurality of instructions, when executed, further cause the controller to activate derating in the case of high temperature values based on the estimated motor winding temperature.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

Figure 1:
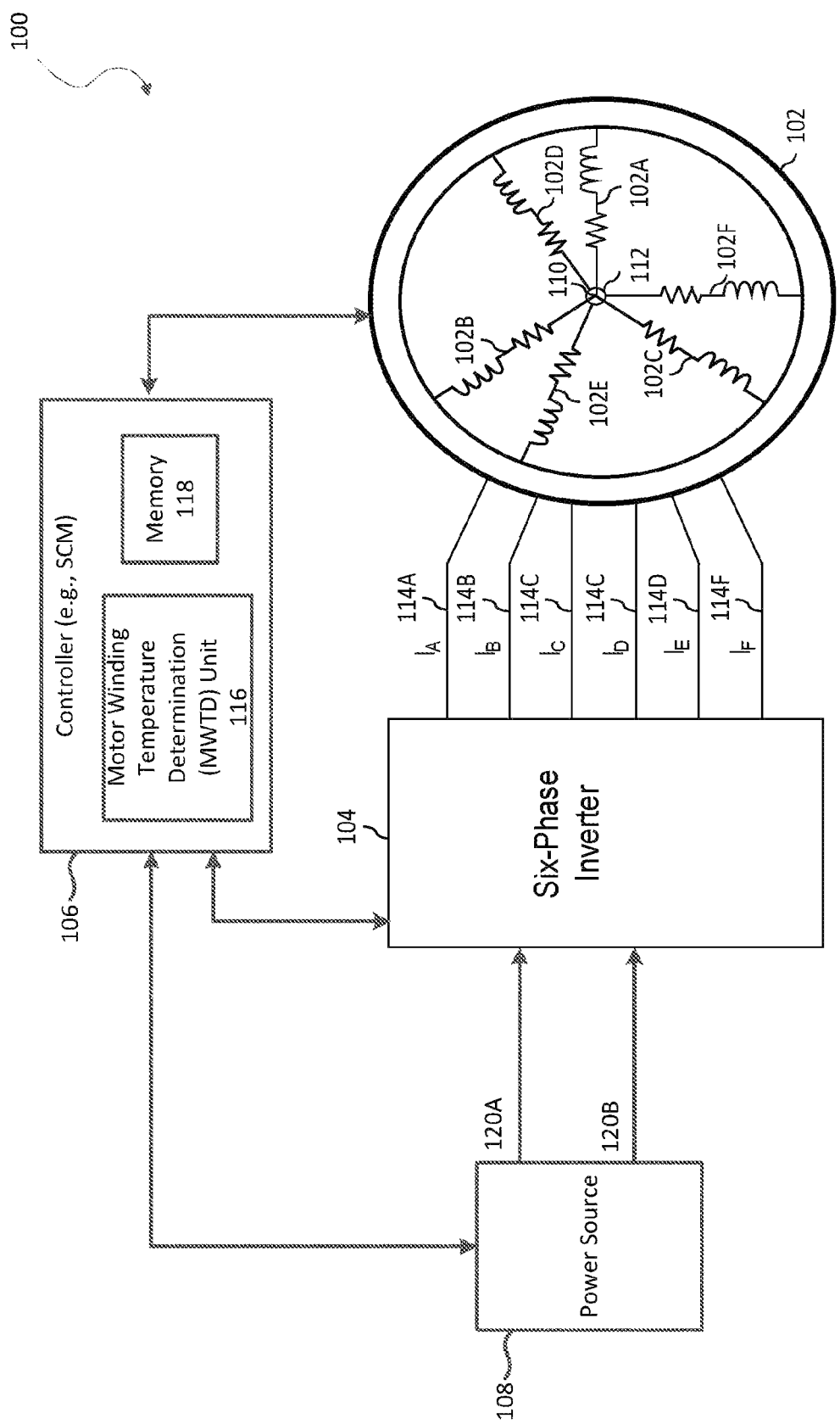
FIG. 1 is a block diagram illustrating a six-phase electric drive system.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

As will be described below, a method and/or system of the estimation of winding temperature of an electric machine is determined using the negative temperature coefficient (NTC) temperature sensor temperatures. The estimation of the winding temperature may have a non-linear relationship with the NTC temperature. As such, a data-driven method and system is proposed to determine the relationship with them. For example, the winding temperature may be sensed for different operating conditions/parameters. Meanwhile, the NTC temperature is also sensed. From this, the relationship between the NTC temperature and the winding temperature may be estimated while considering the operating condition.

Referring now to FIG. 1, a block diagram of a six-phase electric system 100 is shown including a six-phase electric machine 102, an inverter 104, a controller 106 (e.g., a supervising control module (SCM)), and a power source 108. The controller 106 controls the operation of the six-phase electric machine 102 via the inverter 104 such that the six-phase electric machine 102 may use DC power inputs provided to the inverter 104 by the power source 108. As used herein, the term "electric machine" refers to an AC powered device and/or machine that converts electrical energy to mechanical energy or vice versa. Electric devices may be classified into synchronous electric machines and asynchronous electric machines. Synchronous electric machines may include permanent magnet machines and reluctance machines. In some instances, the six-phase electric machine 102 is a six-phase asymmetric permanent magnet synchronous electric machine used to provide torque in an electric vehicle. However, it should be appreciated that the disclosed embodiments can relate to other types of electric systems in the context of other applications.

The six-phase electric machine 102 has six windings 102A-102F, each being associated with a respective phase A-F of six-phase electric machine 102. Windings 102A-102C are coupled together at a first neutral connection 110, while windings 102D-102F are coupled together in a second neutral connection 112. First and second neutral connections 110, 112 are electrically isolated. With this configuration, six-phase electric machine 102 is set up like two individual three-phase machines. That is, windings 102A-102C comprise a first set of three-phase, and windings 102D-102F comprise a second set of three-phase. The two sets of windings are shifted (e.g., spatially) from one another by a phase value of 30° electrical to improve torque performance.

The windings 102A-102F represent a stator of the six-phase electric machine 102. For ease of illustration, the stator and other components (e.g., rotor, shaft, etc.) of the six-phase electric machine 102 are not shown. Generally, the rotor is mounted to the shaft and the rotor is separated from the stator by an air gap. When utilized as a motor, the stator causes the rotor to rotate utilizing electrical energy thereby rotating the shaft to provide mechanical energy. On the other hand, when utilized as a generator, the shaft is rotated by an external mechanical force that causes the rotor to rotate thereby causing the stator to generate electrical energy.

The six-phase inverter 104 includes, among other things, switching devices (e.g., transistors and/or diodes) to appropriately switch DC voltages and provide energization to windings 102A-102F of six-phase electric machine 102 as known to those skilled in the art. In some examples, the inverter 104 may be a pulse-width-modulated inverter.

The controller 106 may receive information such as temperature readings (e.g., negative temperature coefficient (NTC) thermistor temperature readings) from the inverter 104. The controller 106 may also control the operation of the inverter 104. For example, the controller 106 may provide instructions to the inverter 104 to adjust the switching frequencies and/or switching methods for the inverter 104. The inverter 104 will be described in further detail below.

The power source 108 may be any type of DC power source such as a battery (e.g., a vehicle battery). The power source 108 provides DC power to the six-phase inverter 104 via power lines 120A and 120B. For example, the controller 106 may control the amount of power (e.g., voltage and/or current) provided by the power source 108 to the six-phase electric machine 102 via the six-phase inverter 104.

The controller 106 (e g an SCM) controls the operation of the six-phase electric system 100. For example, the controller 106 includes a motor winding temperature determination (MWTD) unit 116 and memory 118. The controller 106 (e.g., the MWTD unit 116) receives information from the six-phase electric machine 102 and/or other sensors/devices within the six-phase electric system 100. The information may include voltage information (e.g., DC voltage from the power source 108), current information (e.g., current from the inverter 104 to the six-phase electric machine 102), temperature information (e.g., NTC temperature information and/or winding temperature information), and/or other types of information. The controller 106 retrieves information from memory 118 such as a predictive model associating the winding temperatures and NTC TS reading. The controller 106 uses the predictive model and/or the received information to determine one or more estimated winding temperatures for the windings 102A-102F. The controller 106 adjusts the inputs (e.g., current/voltage) to the electric machine 102 based on the estimated winding temperatures. This will be described in further detail below.

In some variations, the memory 118 is non-transitory memory having instructions that, in response to execution by a processor (e.g., the controller 106), cause the processor to control the operation of the electric drive system 100 (e.g., perform method 400). The processor, non-transitory memory and controller 106 are not particularly limited and can, for example, be physically separate.

In some embodiments, the controller 106 may form a portion of a processing subsystem including one or more computing devices having memory, processing, and communication hardware. The controller 106 may be a single device or a distributed device, and functions of controller 106 can be performed by hardware and/or as computer instructions on a non-transient computer readable storage medium, such as the non-transitory memory. In some embodiments, controller 106 includes one or more interpreters, determiners, evaluators, regulators, and/or processors that functionally execute the operations of controller 106. Interpreters, determiners, evaluators, regulators, and processors can be implemented in hardware and/or as computer instructions on a non-transient computer readable storage medium and can be distributed across various hardware or computer-based components.

Figure 2:
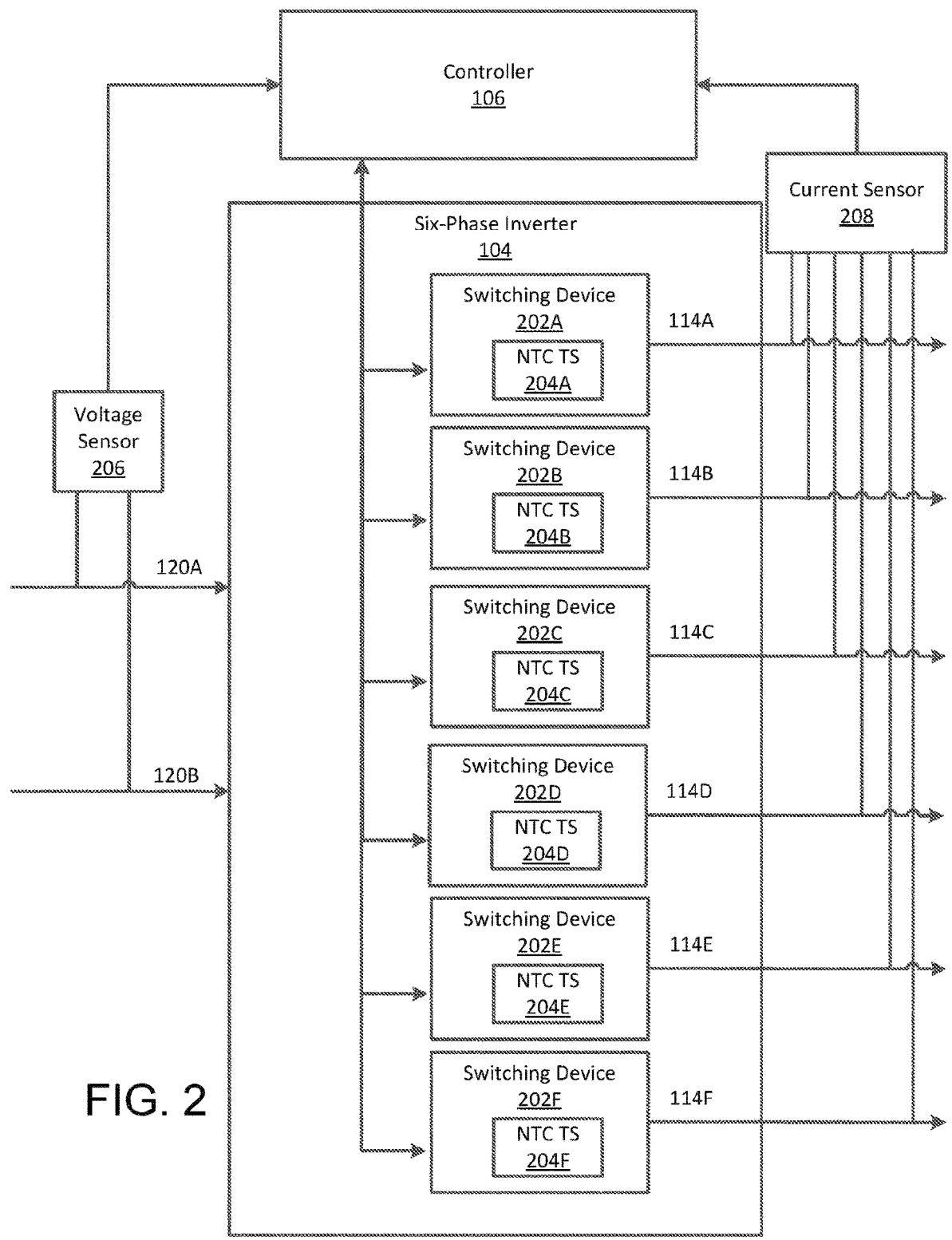
FIG. 2 is a block diagram illustrating the controller and the six-phase inverter of the six-phase electric system of FIG. 1.

FIG. 2 shows a more detailed block diagram of the inputs, outputs, connections, and/or components of the six-phase inverter 104 of the six-phase electric system 100. For example, the six-phase inverter 104 includes six switching modules 202A-F. Each module may contain two switching devices. Each switching device 202A-is electrically coupled to a winding (e.g., 102A-102F) of the six-phase electric machine 102. Additionally, the switching devices 202A-F also include negative temperature coefficient temperature sensors (NTC TS) 204A-204F. NTC TS 204A-F determine, monitor, and/or detect the temperatures of the switching devices 202 A-F. NTC TS 204A-F provide information indicating the temperature readings for the switching devices 202A-F to the controller 106. NTC TS 204A-F are known in the art and may be any type of temperature sensor that uses a negative temperature coefficient to determine the temperature of the switching devices 202A-F.

For instance, in some examples, the switching devices 202A-F are made of transistors (e.g., insulated-gate bipolar transistors (IGBTs)). The NTC TS 204A-F are NTC thermistors that are used to determine the temperature of the switching devices 202A-F. The NTC TS 204A-F provide sensor information to the controller 106 indicating the temperatures of the switching devices 202A-F. For example, the resistance of the NTC thermistors vary based on the temperature. Based on the determined resistance value, the controller 106 determines the temperature of the IGBTs.

The six-phase inverter 104 receives inputs 120A and 120B (e.g., power, current, and/or voltage) from the power source 108. The inputs 120A and 120B may be DC inputs (e.g., DC voltage/current). The voltage sensor 206 is operatively coupled to the inputs 120A and 120B and detects the DC voltage provided by the power source 108 to the six-phase inverter 104. The voltage sensor 206 provides information indicating the DC voltage to the controller 106.

The six-phase inverter 104 provides output 114A-F (e.g., AC current/voltage) to the six-phase electric device 102. In other words, the six-phase inverter 104 provides stator currents 114A-114F to respective windings 102A-102F. The current sensor 208 determines the stator currents 114A-F and provides sensor information indicating the currents to the controller 106.

Figure 3:
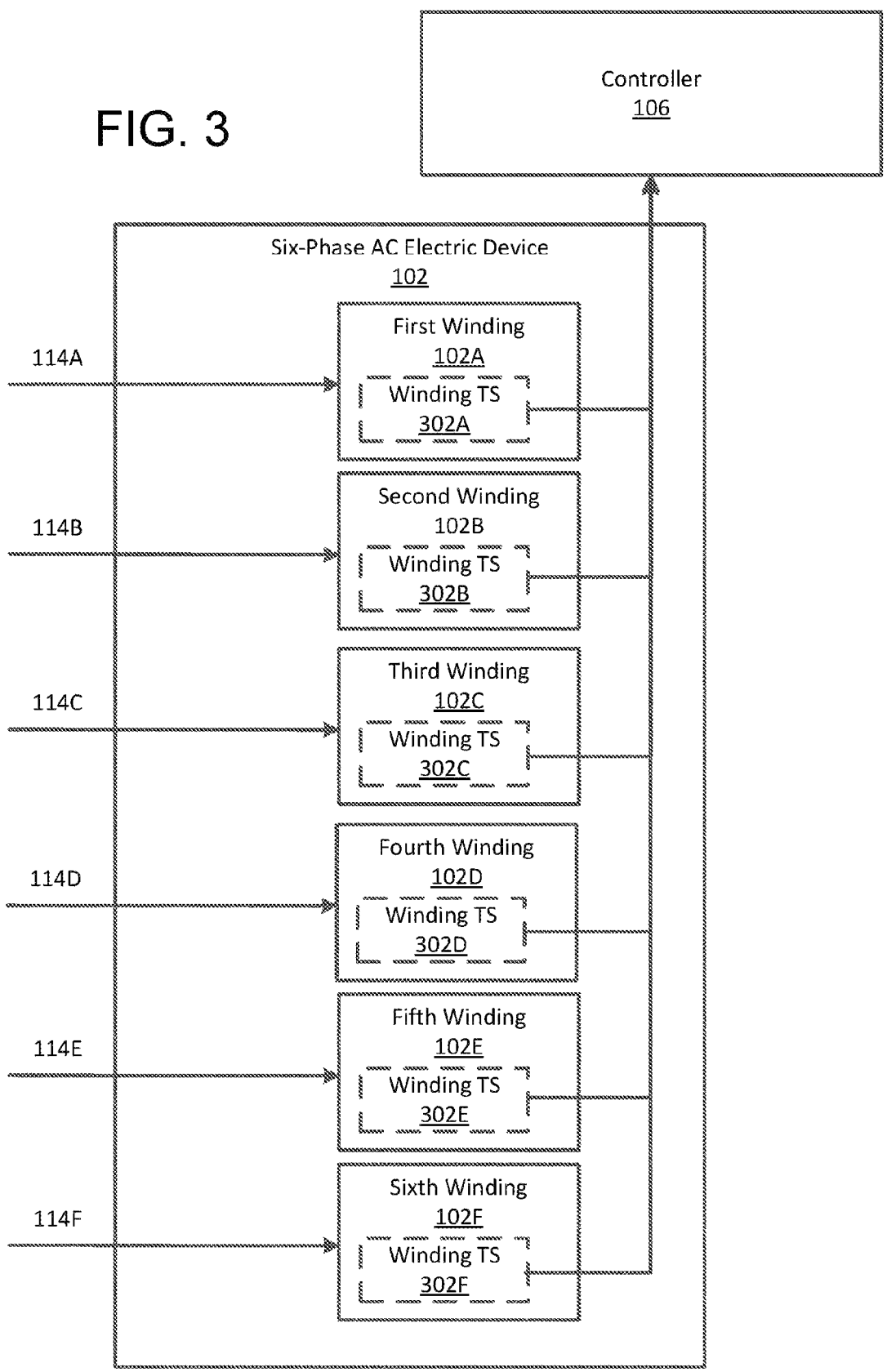
FIG. 3 is a block diagram illustrating the controller and the six-phase electric device of the six-phase electric system of FIG. 1.

FIG. 3 shows a more detailed block diagram of the inputs, outputs, connections, and/or components of the six-phase electric machine 102 of the six-phase electric system 100. For example, the stator currents 114A-F are provided to the windings 102A-F. The windings 102A-F use the currents to generate power. In some examples, the windings 102A-F include winding temperature sensors (winding TS) 302A-F. The winding TS 302A-F detect, monitor, and/or determine the temperatures at the windings 102A-F. The winding TS 302A-F provide information indicating, the temperature readings to the controller 106.

Figure 4:
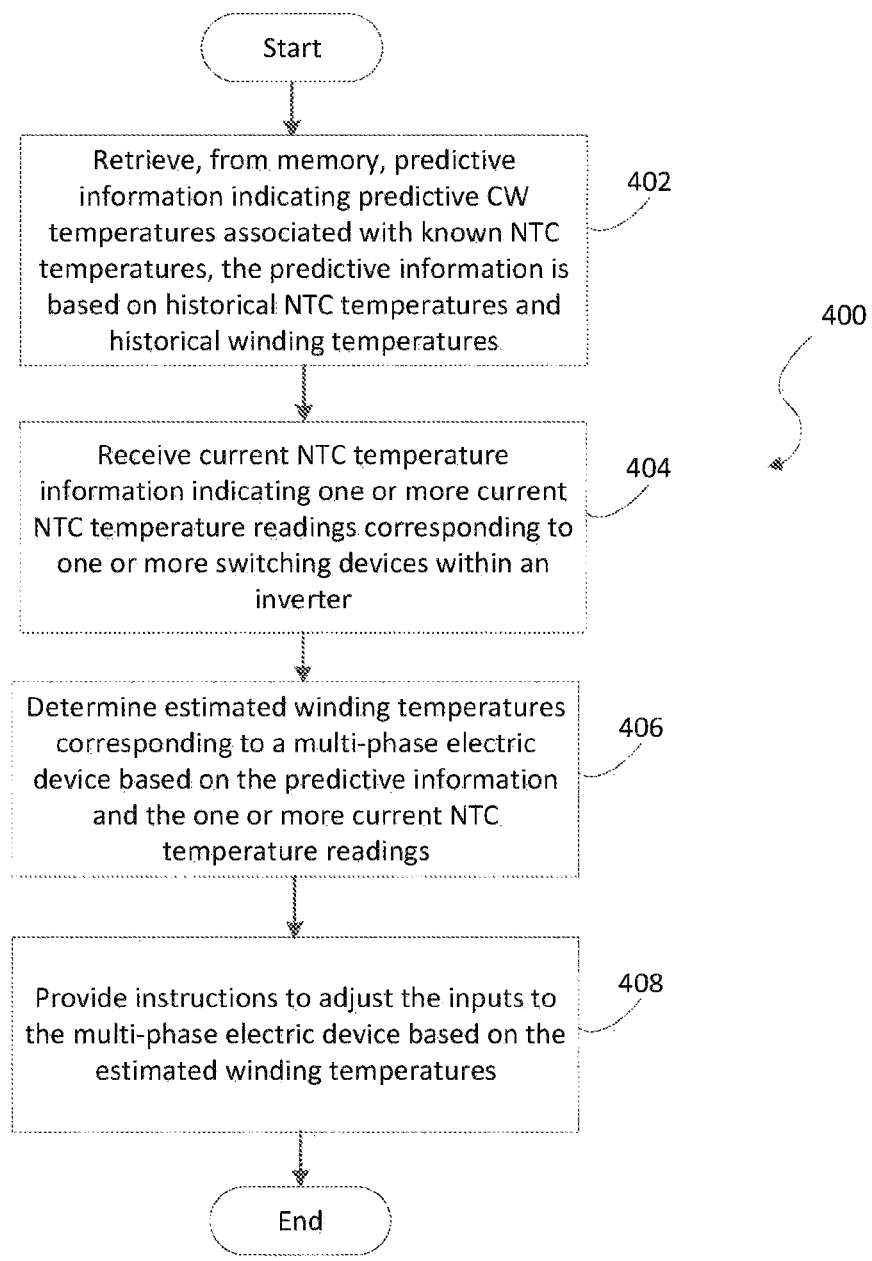
FIG. 4 is a flow chart illustrating a method for operating the six-phase electric system of FIG. 1.

FIG. 4 shows a method 400 for operating an electric drive system such as the six-phase electric system 100. The method 400 will be described with reference to the six-phase electric system 100 shown in FIGS. 1-3 above. However, in some examples, method 400 may also be used with other types of electric drive systems including a three-phase electric system. Additionally, and/or alternatively, method 400 may also be used for powering electric vehicles and/or other types of applications.

At block 402, the controller 106 retrieves, from memory (e.g., memory 118), predictive model that can predict winding temperatures based on known negative temperature coefficient (NTC) temperatures. The predictive model is based on historical NTC temperatures (transistor temperatures) and historical winding temperatures. For example, the controller 106 receives historical NTC temperatures from the NTC TSs 204A-F. The historical NTC temperatures are temperatures of the switching devices 202A-F during a previous period of time. The controller 106 also receives historical winding temperatures from the winding TS 302A-F. The historical winding temperatures are temperatures of the windings 102 A-F during the previous period of time.

The controller 106 uses the historical winding temperatures and historical NTC temperatures during the previous period of time (e.g., first period of time) to determine the predictive model. The predictive model indicates an empirical model, relationship, correlation, algorithm, and/or other connection between the historical winding, temperatures and the historical NTC temperatures. For example, the predictive model may be a mathematical algorithm such as a transfer function, a high-order equation, a logarithmic equation, and/or any other type of linear/non-linear equation, or a lookup table. The controller 106 stores the predictive model (e.g., the relationship, correlation, algorithm, and/or other connection) in memory 118 and retrieves it at a later period in time.

In other words, the controller 106 uses data training to determine the predictive model (e.g., a mathematical relationship between the two temperatures such as an empirical model). For example, during a previous period of time such as during a developmental, testing, or calibration phase for the six-phase electrical system 100, the controller 106 may operate the six-phase electrical system 100 to determine the predictive model. In other words, at this previous period in time, the six-phase electric machine 102 may include winding TS 302A-F The controller 106 may receive information indicating the temperatures for the switching devices 202A-F using the NTC TS 204A-F and the temperatures for the windings 102A-F using the winding TS 302A-F over a period in time. Then, the controller 106 uses the dataset to train/determine calculate the empirical model, such as a mathematical relationship (e.g., non-linear mathematical model), between the two temperatures readings from the temperature sensors 204A-F and 302A-F. The controller 106 stores the empirical model in memory 118 and at a later period in time, the controller 106 retrieves the empirical model (i.e., predictive model) from memory 118.

Figure 5:
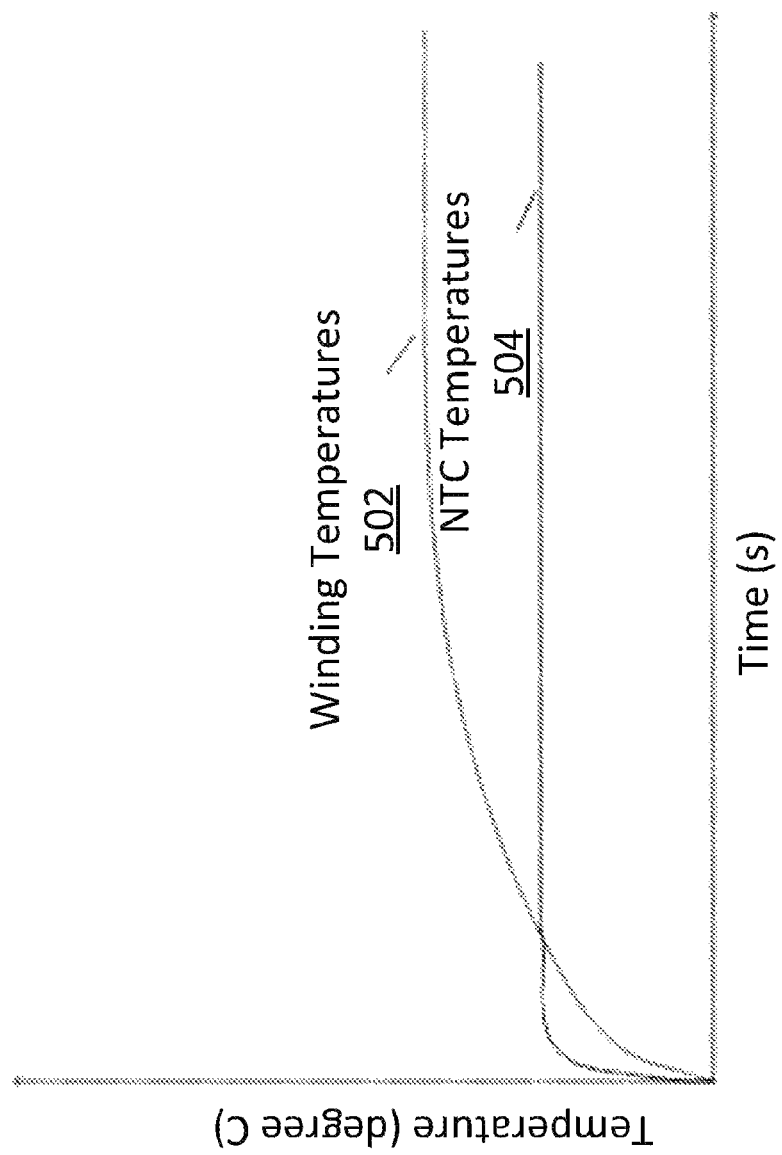
FIG. 5 is a graphical representation of indicating a relationship between negative temperature coefficient (NTC) temperature sensor temperatures and motor winding temperatures.

FIG. 5 shows a graphical representation of the NTC temperatures and the winding temperatures during the previous period of time (e.g., during a testing phase). For example, the controller 106 receives the winding temperatures 502 from the winding TS 302A-F. The controller 106 receives the NTC temperatures 504 from the NTC TS 204A-F. The controller 106 determines the empirical model using the winding temperatures 502 and the NTC temperatures 504.

In some variations, the predictive model considers one or more operating parameters for the six-phase electrical system 100. The operating parameters include, but are not limited to, the DC Voltage (Vdc), the switching frequency of the switching devices 202A-F, the power factor (PF), the stator currents 114A-F, and/or the switching method. For example, the operating parameters may impact the relationship between the temperatures of the switching devices 202A-F and the temperatures of the windings 102A-F. During the data training phase, the controller 106 may take into account the operating parameters when determining the predictive model.

In other words, the controller 106 may set one or more first operating parameters (e.g., a first switching frequency) for the six-phase electrical system 100 and may collect (e.g., receive) the winding temperature information and the NTC temperature information at the first operating parameters. The controller 106 may then adjust the operating parameters (e.g., set the switching frequency to a second switching frequency) and may continue to collect the winding temperature information and the NTC temperature information at the new operating parameters. This process may repeat and the controller 106 may receive multiple datasets of the winding temperature information and the NTC temperature information at different operating parameters. The controller 106 may use the datasets with the different operating parameters to determine the predictive model/the empirical model.

For example, the switching frequency indicates a rate at which the switching devices 202A-F switches on or off. In other words, the switching frequency is a rate or frequency that the DC voltage from the DC power source 108 is switched on and provides current (e.g., 114A-F) to the respective windings (e g 102A-F) or is switched off and does not provide current to the windings. The switching frequency may impact the NTC temperature readings and might not impact the winding temperature readings. For example, if the switching frequency increases and the other operating parameters are substantially the same, the NTC temperature may increase and the winding temperature may remain the same. The controller 106 may determine the relationship based on the datasets of temperature information at the different switching frequencies. Then, the controller 106 may determine the predictive model/the empirical model based on these datasets from the different switching frequencies (e.g., by taking into account of the relationship between the different switching frequencies and the temperature information).

The Vdc is the DC voltage from the power source 108 to the inverter 104. The controller 106 receives the Vdc from the voltage sensor 206. The Vdc may impact the NTC temperature readings and the winding temperature readings by affecting in constant manner or may increase the slope of the thermal curve. For example, higher Vdc results in higher loss in power switches, which leads to higher NTC temperature. On the other hand, Vdc has little effect on machine winding loss and temperature. Additionally, for a similar load, for a lower DC voltage, the motor may require a higher current. As a result, the loss and temperature profile would change correspondingly.

The stator currents 114A-F are currents from the inverter 104 to the six-phase electric device 102. The controller 106 receives the stator currents 114A-F from the current sensor 208. The stator currents 114A-F may impact the NTC temperature readings and the winding temperature readings. For example, higher current results in higher loss in both power switch and machine winding, which leads to higher temperature in both NTC and machine winding.

The power factor is a ratio between the real power that is used to perform work (e.g., provided to the load) and the imaginary power that is circulated in the system 100. The controller 106 may set the power factor based on the load being applied to the system 100 (e.g., operating the electric vehicle). The power factor has little effect on both NTC and machine winding temperature.

It should be appreciated that different switching methods may result in different loss in power switches while there may be insignificant change in machine winding loss. For example, discontinuous pulse width modulation (PWM) results in less loss in power switches than continuous PWM, thus results in lower NTC temperature.

In some examples, the controller 106 may determine the predictive model using a first electrical drive system and may retrieve or use the predictive model for a second electrical drive system. For example, the six-phase electric machine 102 for the first electrical drive system may include winding TS 302A-F. The controller 106 may determine the predictive model using the winding TS 302A-F from the first electrical drive system and the NTC TS 204A-F from the six-phase inverters 104. The six-phase electric machine 102 for the second electrical drive system might not include winding TS 302A-F. The controller 106 may use the predictive model stored in memory 118 to control the second electrical drive system that does not include the winding TS 302A-F. In some instances, the first electrical drive system and the second electrical drive system are different systems. In other instances, the first electrical drive system and the second electrical drive system are the same system and after determining the predictive model, the winding TS 302A-F are removed from the system.

At block 404, the controller 106 receives NTC temperature information indicating one or more current NTC temperature readings corresponding to one or more power switches 202A-F within an inverter 104. The controller 106 may receive the NTC temperature information from one or more NTC TS 204A-F. For example, after retrieving the prediction information that is based on the historical NTC temperatures and the historical winding temperatures, the controller 106 receives, current NTC temperatures from the NTC TS 204A-F.

At block 406, the controller 106 determines estimated winding temperatures corresponding to an electric machine 102 based on the predictive model and the one or more current NTC temperature readings. For example, at a subsequent period of time after determining the predictive model, the controller 106 receives current NTC temperature readings. For instance, in systems 100 with winding TS 302A-F, one or more of the winding TS 302A-F may be having a fault and/or malfunctioning (e.g., providing inaccurate coiling winding temperature readings). As such, the controller 106 may determine estimated winding temperatures using the predictive model (e.g., empirical model) determined above.

Additionally, and/or alternatively, the predictive model may indicate datasets of temperature information (e.g., NTC temperature and/or winding temperature) at different operating parameters. The controller 106 may receive information indicating the current operating parameters of the six-phase electric system 100 (e.g., a current Vdc, a current switching frequency of the switching devices 202A-F, a current power factor (PF), current stator currents 114A-F, and/or a current switching method). The controller 106 may use the current operating parameters and the datasets of temperature information at the different operating parameters to determine estimated winding temperatures.

In other words, the predictive model may include datasets at the different operating parameters. Using the current operating parameters, the controller 106 may determine the dataset with a historical operating parameter that is similar to the current operating parameter (e.g., if the current Vdc is 10 Volts, the controller 106 may determine a dataset with a historical operating parameter of 10 Volts or close to 10 Volts such as 8 Volts).

In some examples, the controller 106 adjusts the empirical model based on the datasets at the different operating parameters and the current operating parameters. For example, the controller 106 may determine, using the datasets at the different operating parameters, that the switching frequency impacts the NTC temperature readings and does not impact the winding temperature readings. The controller 106 adjusts the empirical model based on this information. Then, using the current operating parameter/current switching frequency, the controller 106 determines the estimated winding temperatures for the electric machine 102.

In some instances, the controller 106 determines the predictive model using a first electric drive system with winding TS 302A-F. At blocks 404 and 406, the controller 106 determines the estimated winding temperatures for a second electric drive system. The second electric drive system might not include the winding TS 302A-F (e.g., the first and second systems are separate systems and/or the winding TS 302A-F were removed after determining the predictive model). In other words, even if a second electric drive system does not include winding temperature sensors, the controller 106 may still determine and use the estimated winding temperatures to control the system.

At block 408, the controller 106 provides instructions to adjust the inputs to the electric machine (e.g., the six-phase electric machine 102) based on the estimated winding temperatures. The inputs to the electric machine 102 may be any input that may change the winding temperatures of the windings 102A-F For example, the inputs include, but are not limited to, the Vdc, the switching frequency, the switching method, stator current, and/or the power factor. For instance, the controller 106 may provide instructions to the power source 108 to adjust the Vdc based on determining the estimated winding temperatures are above or below a certain threshold.

By using the above methods and/or systems, there may be a faster realization of winding temperature readings. For example, determining the winding temperature readings using method 400 may have a faster realization than receiving the temperature readings from the winding TS 302A-F, Additionally, and/or alternatively, costs may be minimized if the winding TS 302A-F do not need to be installed. Furthermore, the above methods and/or systems may allow flexibility in control (loss minimization) and/or allows better prediction in the Analysis Led Design (ALD) stage Additionally, the above methods and/or systems may support the main controller to trigger any protection scheme in case the ADC calibration or the sensor calibration may become wrong.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for operating an electric drive system comprising an electric machine, an inverter, and a controller, the method comprising:
retrieving, from memory and by the controller, a predictive model indicating predictive winding temperatures associated with known thermistor negative temperature coefficient (NTC) temperatures, wherein the predictive model is based on historical NTC temperatures and historical winding temperatures;
receiving current NTC information indicating one or more current NTC readings corresponding to one or more switching devices within the inverter;
determining estimated winding temperatures corresponding to the electric machine based on the predictive model and the one or more current NTC readings; and
providing instructions to adjust inputs to the electric machine based on the estimated winding temperatures.

2. The method of claim 1, further comprising:
determining the predictive model indicating the predictive winding temperatures associated with the known NTC temperatures; and
storing the predictive model in the memory.

3. The method of claim 2, wherein determining the predictive model comprises:
receiving, from one or more temperature sensors operatively coupled to one or more windings of the electric machine, the historical winding temperatures for a first period of time;
receiving, from one or more NTC temperature sensors, the historical NTC temperatures for the first period of time; and
training a model using a dataset to generate the predictive model using the historical winding temperatures and the historical NTC temperatures.

4. The method of claim 3, wherein training the model comprises determining a non-linear or linear mathematical model using the historical NTC temperatures and the historical winding temperatures.

5. The method of claim 3, wherein determining the predictive model further comprises:
adjusting one or more operating parameters associated with the electric drive system;
receiving, from the one or more temperature sensors operatively coupled to the one or more windings of the electric machine, a second set of historical winding temperatures based on the adjusting the one or more operating parameters;

receiving, from the one or more NTC temperature sensors, a second set of historical NTC temperatures based on the adjusting the one or more operating parameters, and wherein the training the model using the dataset to generate the predictive model comprises training the dataset using the historical winding temperatures, the historical NTC temperatures, the second set of historical winding temperatures, and the second set of historical NTC temperatures.

6. The method of claim 5, wherein adjusting the one or more operating parameters comprises adjusting a switching frequency associated with the one or more switching devices within the inverter.

7. The method of claim 5, wherein adjusting the one or more operating parameters comprises adjusting a direct current (DC) voltage associated with a power source, wherein the power source provides DC power to the inverter.

8. The method of claim 5, wherein adjusting the one or more operating parameters comprises adjusting a stator current associated with the inverter and the electric machine.

9. The method of claim 5, wherein adjusting the one or more operating parameters comprises adjusting a power factor (PF) associated with the multi-phase electrical system.

10. The method of claim 5, wherein adjusting the one or more operating parameters comprises altering a switching method for the inverter.

11. The method of claim 1, wherein the controller activates derating in the case of high temperature values based on the estimated motor winding temperature.

12. A controller of an electric driver system having an electric machine and an inverter, the controller comprising:
a processor; and
a memory having a plurality of instructions stored thereon that, when executed by the processor, causes the controller to:
retrieve a predictive model indicating predictive winding temperatures associated with known thermistor negative temperature coefficient (NTC) temperatures, wherein the predictive model is based on historical NTC temperatures and historical winding temperatures;
receive current NTC information indicating one or more current NTC readings corresponding to one or more switching devices within the inverter;
determine estimated winding temperatures corresponding to the electric machine based on the predictive model and the one or more current NTC readings; and
provide instructions to adjust inputs to the electric machine based on the estimated winding temperatures.

13. The controller of claim 12, wherein the plurality of instructions, when executed, further cause the controller to:
determine the predictive model indicating the predictive winding temperatures associated with the known NTC temperatures; and
store the predictive model in the memory.

14. The controller of claim 13, wherein to determine the predictive model comprises to:
receive, from one or more temperature sensors operatively coupled to one or more windings of the electric machine, the historical winding temperatures for a first period of time;
receive, from one or more NTC temperature sensors, the historical NTC temperatures for the first period of time; and
train a model using a dataset to generate the predictive model using the historical winding temperatures and the historical NTC temperatures.

15. The controller of claim 14, wherein to train the model comprises to determine a non-linear or linear mathematical model using the historical NTC temperatures and the historical winding temperatures.

16. The controller of claim 14, wherein to determine the predictive model comprises to:
adjust one or more operating parameters associated with the electric drive system;
receive, from the one or more temperature sensors operatively coupled to the one or more windings of the electric machine, a second set of historical winding temperatures based on the adjusting the one or more operating parameters;
receive, from the one or more NTC temperature sensors, a second set of historical NTC temperatures based on the adjusting the one or more operating parameters, and
wherein the training the model using the dataset to generate the predictive model comprises training the dataset using the historical winding temperatures, the historical NTC temperatures, the second set of historical winding temperatures, and the second set of historical NTC temperatures.

17. The controller of claim 16, wherein to adjust the one or more operating parameters comprises to adjust a switching frequency associated with the one or more switching devices within the inverter, or to adjust a direct current (DC) voltage associated with a power source, wherein the power source provides DC power to the inverter.

18. The controller of claim 16, wherein to adjust the one or more operating parameters comprises to adjust a stator current associated with the inverter and the electric machine, to adjust a power factor (PF) associated with the multi-phase electrical system, or to alter a switching method for the inverter.

19. The controller of claim 12, wherein the plurality of instructions, when executed, further cause the controller to activate derating in the case of high temperature values based on the estimated motor winding temperature.

20. An electric driver system comprising:
an electric machine;
an inverter;
a power source configured to provide DC power to the inverter; and
a controller operatively coupled with the electric machine, the inverter, and the power source, the controller comprising a processor and a memory having a plurality of instructions stored thereon that, when executed by the processor, causes the controller to:
retrieve a predictive model indicating predictive winding temperatures associated with known thermistor negative temperature coefficient (NTC) temperatures, wherein the predictive model is based on historical NTC temperatures and historical winding temperatures;

receive current NTC information indicating one or more current NTC readings corresponding to one or more switching devices within the inverter;

determine estimated winding temperatures corresponding to the electric machine based on the predictive model and the one or more current NTC readings; and provide instructions to adjust inputs to the electric machine based on the estimated winding temperatures.

* * * * *